(No Model.)
R. T. KILLEY.
RUNNING GEAR FOR VEHICLES.
No. 322,109. Patented July 14, 1885.
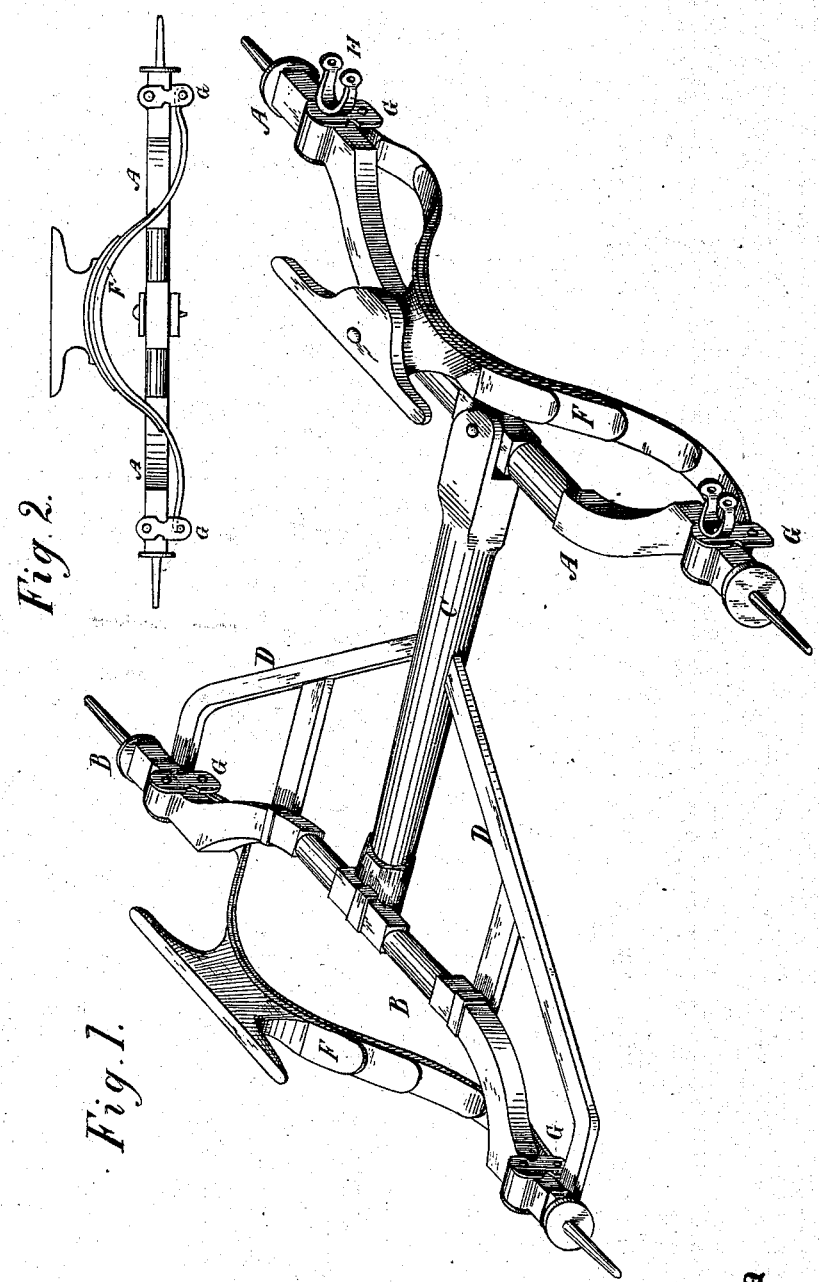
Witnesses,
Geo. H. Strong.
J. H. Rourke.
Inventor,
R. T. Killey
By
Dewey & Co.
Attorneys

UNITED STATES PATENT OFFICE.

ROBERT T. KILLEY, OF TRES PINOS, CALIFORNIA.

RUNNING-GEAR FOR VEHICLES.

SPECIFICATION forming part of Letters Patent No. 322,109, dated July 14, 1885.

Application filed May 27, 1884. (No model.)

*To all whom it may concern:*

Be it known that I, ROBERT T. KILLEY, of the city of Tres Pinos, and county of San Benito, and State of California, have invented an Improvement in Running-Gear for Vehicles; and I hereby declare the following to be a full, clear, and exact description thereof.

My invention relates to certain improvements in running-gear for vehicles; and it consists of certain details of construction, as hereinafter specifically claimed.

Referring to the accompanying drawings for a more complete explanation of my invention, Figure 1 is a perspective view showing my running-gear, and Fig. 2 is a front view of the same.

A is the front, and B is the rear, axle of the vehicle, united by perch C and having the usual or any suitable braces, D, extending from the rear axle to the perch, so as to unite them rigidly. The front axle has a swivel-connection with the perch, so as to allow it to be turned from side to side to direct the vehicle in the usual manner. These axles have that portion near the shoulder made straight for a short distance, and are then bent horizontally, so that the central portion is not in line with the spindle, but those portions of the two axles are nearer to each other, as shown, the shape of the axles being that of an elongated crank the crank portion of which is horizontal.

F are the springs of the vehicle, extending across and of such a form that the central portion stands high enough to support the vehicle-body upon the convex-curved portion. Toward the end the curve is reversed, so as to pass beneath the straight portion of the axle, and the ends are suspended beneath this portion by links or shackles G, which are attached to the axles close to the shoulders. The springs thus stand in line, with their end portion beneath the straight part of the axle and the central portion curving up in the space formed by the bending of the axles out of line, the vehicle being supported upon the top of this central portion. By this construction the strain of the weight of the load is brought very close to the shoulders, and the liability of the axles to bend by sudden or unusual strains is greatly lessened. By suspending the ends of the springs from beneath the axle the load is brought lower, and the links allow a certain swinging or side motion, which relieves side strains or shocks and saves the wheels and running-gear.

Upon the front axle the swinging links or hangers are suspended from the same bolt which carries the thill-coupling H, as shown.

I am aware that it is not new to provide axles bent or cranked horizontally from points near their outer ends with springs suspended beneath the axles from pivoted links; and I do not broadly claim such construction.

What I claim is—

In a running-gear for vehicles, horizontally-cranked axles, links pivoted to the said axles at their upper ends and supporting the springs at their lower ends, combined with the thill-couplings H, secured to the front axle by the same bolt which holds the links G in place, substantially as described.

In witness whereof I have hereunto set my hand.

ROBERT T. KILLEY.

Witnesses:
 S. H. NOURSE,
 GEO. H. STRONG.